(12) United States Patent
Kölker

(10) Patent No.: US 6,524,036 B1
(45) Date of Patent: Feb. 25, 2003

(54) METHOD FOR INFLUENCING THE BEHAVIOR OF SWARF FLOW ON TOOL SURFACES

(75) Inventor: Werner Kölker, Ratzeburg (DE)

(73) Assignee: Fette GmbH, Schwarzenbek (DE)

( * ) Notice: Subject to any disclaimer, the term of this patent is extended or adjusted under 35 U.S.C. 154(b) by 0 days.

(21) Appl. No.: 09/086,059

(22) Filed: May 28, 1998

(30) Foreign Application Priority Data

Jun. 10, 1997 (DE) .......................................... 197 24 319

(51) Int. Cl.$^7$ .............................................. B23B 35/00
(52) U.S. Cl. ........................... 409/131; 76/115; 407/54; 407/113; 408/230
(58) Field of Search .................... 407/113, 114, 407/115, 116, 53, 54, 118, 119; 409/131, 132; 76/101.1, 115; 408/1 R, 226, 230, 144

(56) References Cited

U.S. PATENT DOCUMENTS

| 93,212 A | * | 8/1869 | Lutz et al. ..................... 407/53 |
| 1,235,604 A | * | 8/1917 | Royle ........................... 407/53 |
| 2,322,894 A | * | 6/1943 | Stevens ....................... 408/230 |
| 3,074,392 A | * | 1/1963 | Fisher ......................... 408/227 |
| 3,791,001 A | * | 2/1974 | Bennett ....................... 407/113 |

FOREIGN PATENT DOCUMENTS

| DE | 3730943 | * | 4/1989 | ................. 407/113 |
| DE | 44 31 796 A1 | | 3/1996 | |
| SU | 1577180 | * | 5/1991 | ................. 407/113 |
| WO | WO 95/29782 | | 11/1995 | |

OTHER PUBLICATIONS

*Exakt begrenzte Hartezonen* (*Exactly Limited Hardness Zones*) in EXTRA, Sep. 18, 1997, pp. 50–52.
DE–Z: *Industrieanzeiger 17/95*. (*Tools For All Cases*) pp. 40–41.
*Laserstrahloberflachen–bearbeitung zum Vorspannen schiebenformiger Werkzeuge* (*Laser Beam Surface Treatment For Pretensioning Disk–Like Tools*) in IDR 4/91, pp. 220–225.

* cited by examiner

*Primary Examiner*—Daniel W. Howell
(74) *Attorney, Agent, or Firm*—Vidas, Arrett & Steinkraus, P.A.

(57) ABSTRACT

A method for influencing the swarf flow behaviour of tool surfaces in the region of cutting edges with swarf producing tools with a geometrically defined cutter, by laser irradiation of the tool surface, wherein with the help of the laser irradiation at least the faces at a slight distance to the cutting surface are provided with a geometric pattern changing the surface structure.

6 Claims, 2 Drawing Sheets

METHOD FOR INFLUENCING THE BEHAVIOR OF SWARF FLOW ON TOOL SURFACES

BACKGROUND OF THE INVENTION

The invention relates to a method for influencing the behaviour of swarf flow of tool surfaces.

With tools for removing metal one differentiates between those with a geometrically defined cutter and those with a geometrically undefined cutter. The present invention is concerned only with tools with a geometrically defined cutter, e.g. a miller, drill or likewise.

The geometry of cutting tools is amongst other things designed such that a favorable behaviour of swarf flow is achieved. Desirable is swarf which according to shape and length is formed such that it can be easily and quickly led away. A blockage of swarf which compromises the continuity of the machining, and undesirable temperature influences on the surface of the subject are to be avoided. For the swarf flow behaviour not only is the geometry of the cutting tool important, in particular the face, but also the nature of the cutting material itself. The cutting materials are to be distinguished not only by their hardness and stability but also in their coefficients of friction. This however is decisively influenced by the roughness of the surfaces. As is known a rough surface reduces the flow rate of the swarf, whilst a smooth surface increases it.

For increasing the stability of cutting tools it is known such as from U.S. Pat. No. 4,708,542 to coat these with one or more layers of hard material, e.g. tin. For this there are several suitable methods. It has however been shown that such a coating partly considerably changes the behaviour of swarf flow even when the geometry of the tool does not change. Such a coating mostly has a lower coefficient of friction than conventional cutting materials. The increased flow speed on account of the coating however leads to a formation of swarf which may compromise the removal of swarf.

For remedying the last mentioned disadvantage it is known from DE 43 19 789 C2 to grind the face after coating the tool in order to achieve a more favorable removal of swarf. Disadvantageous however are the additional machining procedure and lower tool service life. Moreover there is a lack of experience in which form or scope the grinding of the coating is to be effected in order to achieve an optimal behaviour of swarf flow.

It is generally known to manufacture tools, e.g. indexable inserts, in the sinter pressing method. For influencing the roughness in the region of the surfaces along which the swarf glides, in this context, from DE 44 31 796 A1 or WO 95/29782 A1 it is known to give the face a certain topography which has an influence on the swarf flow of the carbide tip. A disadvantage is that it may only be applied for tools formed by sinter pressing. Tools manufactured by the sinter method often suffer from lack of precision. They are therefore sometimes reground.

From AMENDE, W.: Exactly limited hardness zones, in Industrieanzeige EXTRA of 18.9.1987, Pages 50–52 or DE-Z: INDUSTRIEANZEIGER 17/95 tools for all cases, pages 40–41, it is known to machine tools by way of a laser, in order to harden their surface in the edge zones or also to deposit certain wear-protective layers. From ROSENTHAL, A. R.: laser beam surface treatment for pretensioning disk-like tools, in :IDR 4/91, pages 220–225 it is further disclosed by way of a laser to provide laser tracks in the edge region of circular saw blades with the aim of inducing high tensile stress in the edge region of the tool in order to compensate load stresses.

BRIEF SUMMARY OF THE INVENTION

It is therefore the object of the invention to indicate a method with which the surfaces coming into contact with the swarf, of metal removal tools with a geometrically defined cutter are changed in their behaviour influencing the swarf flow.

This object is achieved by the features of patent claim 1.

With the method according to the invention with the help of laser irradiation at least the face at a slight distance to the cutting edge is provided with a geometric pattern. The pattern according to one formation of the invention may consist of a row of lines and/or points, such as of a strip or a track of lines and/or points, which run at a distance from the cutting edge.

The laser irradiation is such that in the region of the substrate material on the surface a remelting and possibly an oxidation is produced by which means an increased surface roughness arises which has an influence on the metal removal speed. By way of a defined directioning of the marking forming the pattern not only can the flow speed, but also the flow direction can be influenced. Thus e.g. the mentioned marking lines near the cutting edge may consist of parallel distanced line markings which run transversely to the cutting edge, roughly at a right angle or at another angle.

A certain distance to the cutting edge is advantageous since otherwise the danger arises that by way of the remelting and where appropriate the oxidation of the material the material is no longer suitable for the material removal. Also at these locations fracture initiating stress concentrations may originate.

The method according to the invention is not limited to geometrically simply formed tools such as reverse carbide tips, but rather also complicated cutting tools such as twisted end milling cutters, spiral drills, threaded drills or hob cutters may be provided with a topography of the desired structure by way of laser irradiation. Furthermore the invention is not limited to the manufacture of the tool, but rather tools formed by way of sinter pressing or also high-precision ground tools may undergo the method according to the invention.

With the help of the method according to the invention an optical or aesthetic effect can be achieved.

The invention is not limited to the type of change of the surface structure which is obtained by irradiation with a laser. It is however also conceivable to deposit an additional layer in the desired surface region with desired properties influencing the swarf flow.

According to one formation of the invention therefore by way of a laser irradiation also the flank, at a slight distance to the cutting edge, is provided with a marking of the type such that a wear of the cutting edge can be determined. The operating person may then, by viewing the marked flank, recognize whether and how much wear has occurred. If the wear reaches a predetermined mark, the tool must be removed from duty or in the case of a reverse carbide tip turned or exchanged.

It is already known to mark tools with characteristic data in that they are irradiated with a laser light source (laser inscription). For this mostly a gas pulse laser is employed with which the light is directed onto the object via a mask. It is conceivable to apply such pulse lasers also to the method according to the invention. To be preferred however is a solid body laser operated in a cycled manner with a diode laser as a pump energy source. In which manner the laser or the subject is controlled or placed forward so that the desired pattern may be deposited onto the surface of the subject is not the subject-matter of the present invention and is at the discretion of the man skilled in the art.

At the beginning it was mentioned that in many cases on tools a coating with hard material is carried out. With hard material coated tools the depositing of the pattern is effected by the laser irradiation before the coating. It has been ascertained that in the region in which a change of the topography of the subject surface is carried out by way of laser irradiation, also after the coating this turns out differently than the remaining coating. As for the rest the deepenings which are produced by the laser irradiation are also more or less retained after the coating.

BRIEF DESCRIPTION OF THE DRAWINGS

The invention is hereinafter described in more detail by way of examples.

DETAILED DESCRIPTION OF THE INVENTION

Figure 1:
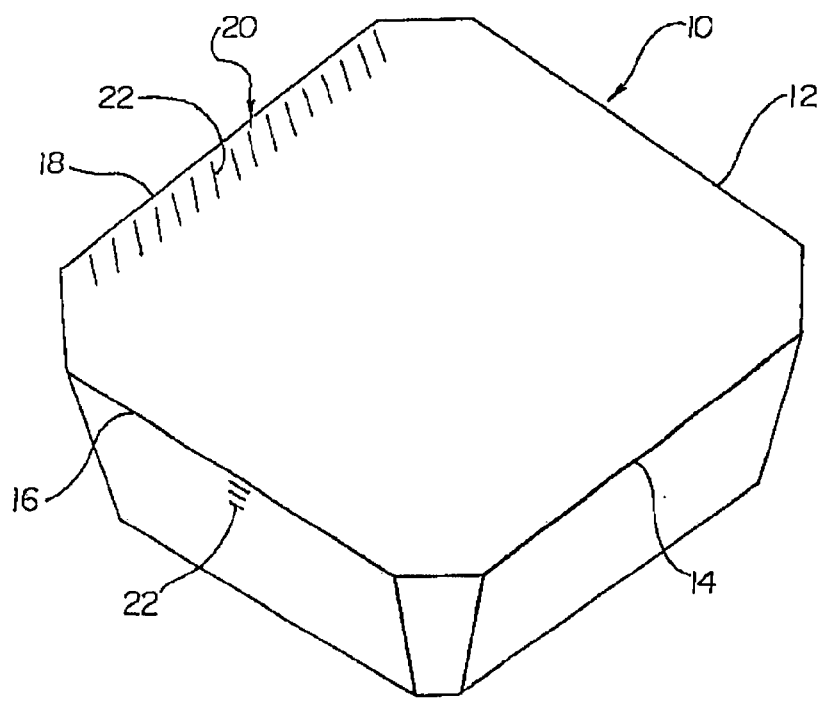
FIG. 1 shows perspectively an indexable insert with a treatment according to the method according to the invention.

In FIG. 1 a square indexable insert can be recognized with four cutting edges 12, 14, 16, and 18. The associated faces cannot be clearly recognized. They are mostly formed by a trough-like design of the upper side of the indexable insert 10. This is however in general the state of the art. Also the exact shape of the flanks may not be deduced from the illustration according to FIG. 1. It may however be deduced from FIG. 1 that parallel to the cutting edge at a relatively slight distance thereto there is formed a track 20 consisting of a number of lines 22 which run parallel to one another at a distance. The lines extend approximately perpendicularly to the cutting edge 18 and are produced by laser irradiation. By changing the angle a different swarf flow behaviour may be produced. The lines are more or less deep furrows or grooves which are formed into the surface of the material of the indexable insert 10. For the case that it concerns a coated indexable insert, the pattern 20 is deposited before coating onto the substrate material. It is to be understood that the faces associated with the other cutting edges 12, 14 and 16 may be provided with a similar topography as the track 20.

It is the object of the surface structure which is produced by the track 20 to optimally form the flow behaviour of the shaped swarf and/or the swarf shape. Furthermore also by way of a specific geometry of the structure the flow direction of the swarf may be influenced.

In FIG. 1 it can further be recognized that a further track 22 of short lines formed parallel to the cutting edge 16 is formed. This is likewise created by laser irradiation. The first of the three lines lies relatively near to the cutting edge 16. With the help of the pattern 22 the wear on the cutting edge 16 can be observed. It is to be understood that also on other flanks a suitable pattern may be formed.

Figure 2:
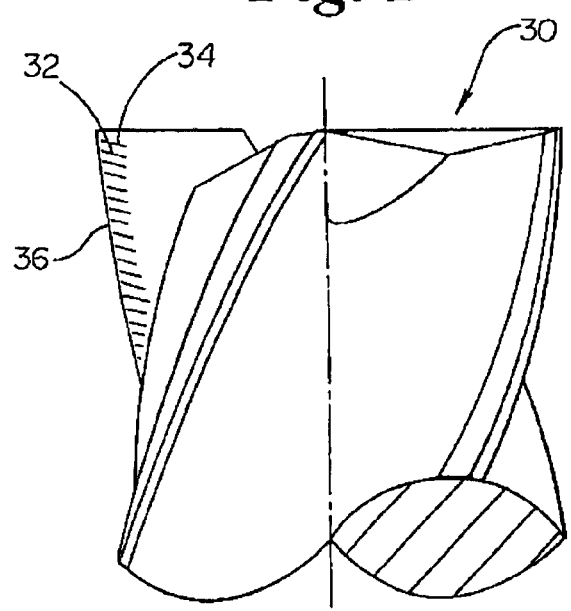
FIG. 2 shows perspectively a tip of an end milling cutter which has been treated according to the method according to the invention.

With the milling cutter tip 30 according to FIG. 2 it is to be recognized that a track 32 is formed of individual lines 34 arranged parallel and at a distance, and at a distance to the cutting edge 36. This is effected in the same manner as has been cited above for FIG. 1. Also in this case the grooves or lines run approximately perpendicularly to the cutting edge 36. By changing the angle, a different swarf flow behaviour can be produced. Also with tools formed in such a manner patterns may be produced on the flanks or on other functioning surfaces of tools.

Figure 3:
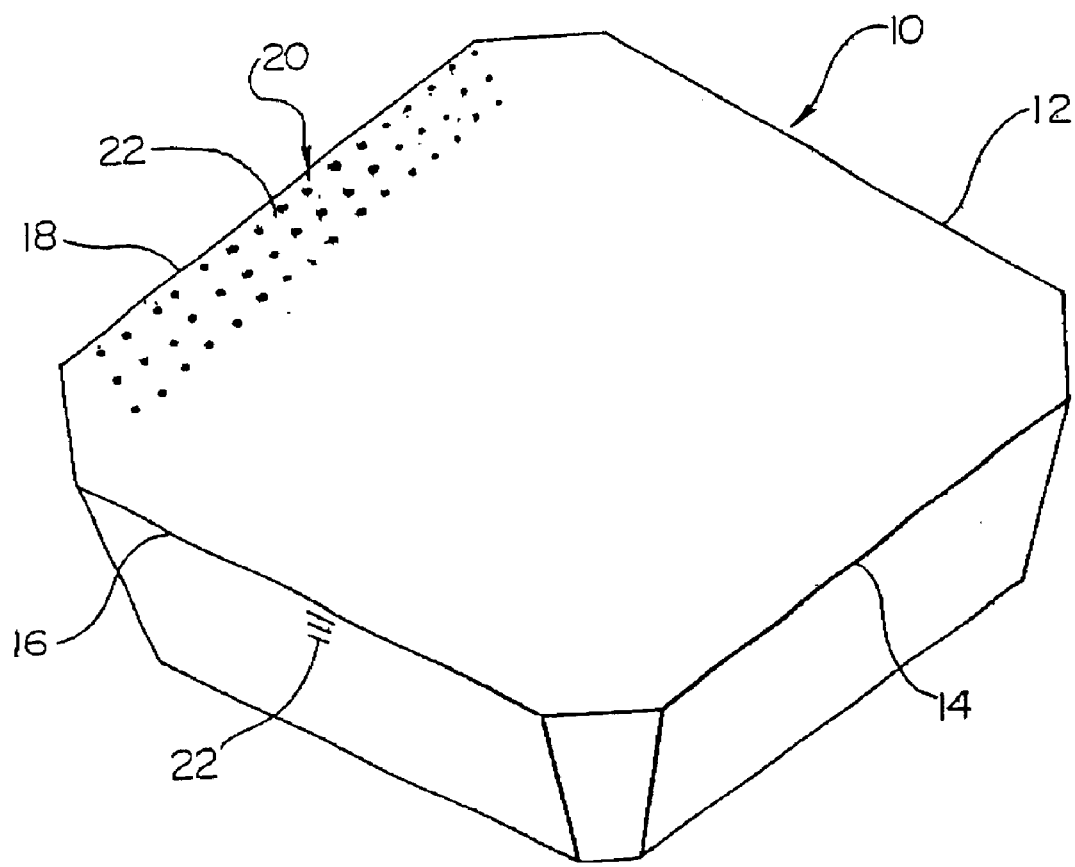
FIG. 3 shows an insert with the surface roughened with points made by laser irradiation.

FIG. 3 shows an insert with the surface roughened with points 23 formed into lines which are spaced a slight distance from the cutting surface.

What is claimed is:

1. A method for influencing the swarf flow behavior of tool surfaces in the region of cutting edges with swarf producing tools with a geometrically defined cutter, comprising the step of:

roughening the tool surface with a geometric pattern spaced a slight distance from a cutting surface by laser irradiation of the tool surface.

2. The method according to claim 1, wherein the geometric pattern is selected from the group consisting of individual lines and points.

3. The method of claim 2 wherein the point geometric pattern is comprised of a plurality of points arranged in parallel lines spaced a slight distance from a cutting surface.

4. The method according to claim 2, wherein the lines extend at an angle to the cutting edge.

5. The method according to claim 1, in which the tool after its shaping at least in the swarf producing region is provided with a coating of hard material, wherein the pattern is formed before the coating.

6. The method of claim 2 wherein the individual line geometric pattern is comprised of a plurality of parallel lines spaced a slight distance from a cutting surface.

* * * * *